United States Patent [19]
Artinian et al.

[11] Patent Number: 6,124,646
[45] Date of Patent: Sep. 26, 2000

[54] AIRCRAFT AIR CONDITIONING SYSTEM INCLUDING ELECTRIC GENERATOR FOR PROVIDING AC POWER HAVING LIMITED FREQUENCY RANGE

[75] Inventors: Vatche Artinian, Long Beach; Terry Brim, Redondo Beach; Dan Matulich, Rolling Hills Estates; Roger Murry, San Pedro, all of Calif.

[73] Assignee: AlliedSignal Inc., Morristown, N.J.

[21] Appl. No.: 09/022,100

[22] Filed: Feb. 11, 1998

[51] Int. Cl.[7] ............................................. F02C 3/00
[52] U.S. Cl. ............................................. 290/52; 60/36.01
[58] Field of Search ........................... 290/52, 18; 322/7, 322/8; 307/64; 60/39.01, 39.03

[56] References Cited

U.S. PATENT DOCUMENTS

| | | | |
|---|---|---|---|
| 3,024,624 | 3/1962 | Morley et al. | 62/402 |
| 3,326,109 | 6/1967 | Markham | 98/1.5 |
| 4,196,773 | 4/1980 | Trumpler | 165/62 |
| 4,261,416 | 4/1981 | Hamamoto | 165/23 |
| 4,494,372 | 1/1985 | Cronin | 60/39.07 |
| 4,684,081 | 8/1987 | Croinin | 244/58 |
| 5,056,335 | 10/1991 | Renninger et al. | 62/402 |
| 5,114,103 | 5/1992 | Coffinberry | 244/209 |
| 5,143,329 | 9/1992 | Coffinberry | 244/209 |
| 5,145,124 | 9/1992 | Brunskill et al. | 244/118.5 |
| 5,151,022 | 9/1992 | Emerson et al. | 423/245.3 |
| 5,442,905 | 8/1995 | Claeys et al. | 60/39.07 |
| 5,535,967 | 7/1996 | Beauchamp et al. | 244/209 |
| 5,779,196 | 7/1998 | Timar | 244/209 |
| 5,939,800 | 8/1999 | Arinian et al. | 307/64 |

FOREIGN PATENT DOCUMENTS

0 888 966 A2  6/1998  European Pat. Off. .

*Primary Examiner*—Nicholas Ponomarenko
*Attorney, Agent, or Firm*—William J. Zak, Jr. Esq.

[57] ABSTRACT

An air conditioning system for an aircraft includes cascaded high and low pressure turbines, an electric generator that is driven at variable speeds by the low pressure turbine, and a fan that is also driven by the low pressure turbine. During operation of the air conditioning system, ac power is generated by the electric generator and provided to electrical equipment onboard the aircraft. Because the electric generator is driven at variable speeds, it generates ac power having variable frequency. The air conditioning system further includes a bypass valve for bypassing the high pressure turbine when speed of the electric generator approaches a lower limit. Bypassing the high pressure turbine allows generator speed to be increased. The fan has a speed-cubed load characteristic that maintains the generator speed below an upper limit. Thus, the bypass valve and the fan can be used to limit the speed of the electric generator and thereby maintain frequency of the ac power between upper and lower limits.

20 Claims, 5 Drawing Sheets

AIRCRAFT AIR CONDITIONING SYSTEM INCLUDING ELECTRIC GENERATOR FOR PROVIDING AC POWER HAVING LIMITED FREQUENCY RANGE

BACKGROUND OF THE INVENTION

The invention relates to environmental control systems. More specifically the invention relates to an aircraft air conditioning system including an air cycle machine and an electric generator.

An air conditioning system for an aircraft is designed to control airflow into the aircraft's passenger cabin as well as air temperature inside the passenger cabin. Most aircraft air conditioning systems operate on an air cycle refrigeration principle. Compressed air is obtained from an intermediate compressor stage of the aircraft's main engine, cooled with ambient air to near-ambient temperature in an air-to-air heat exchanger and then expanded in an air cycle machine to provide a stream of cooled, conditioned air. The conditioned air is supplied to the passenger cabin. Although somewhat expanded, the conditioned air is still compressed in order to pressurize the passenger cabin.

On occasion, the conditioned air might provide more cooling than necessary. The aircraft might climb to a high altitude, or the ambient air might be very cold. Whenever the conditioned air provides more cooling than necessary, the cooling is reduced by a complex combination of valves and controls.

Additionally, the engine supply pressure might sometimes be greater than required. Whenever this occurs, the pressure is typically reduced by throttling the compressed air. Throttling could be performed by modulating a bleed air pressure regulator valve, a pack flow control valve, or a bypass valve for the air cycle machine. However, throttling is a wasteful process that causes engine fuel consumption to be greater than necessary.

Instead of wasting energy through throttling, the energy can be recovered as disclosed by James Strang et al. in USSN 08/987,737 filed on Dec. 9, 1997 and entitled "Environmental Control System including Air Cycle Machine and Electrical Machine." According to the Strang application, which is assigned to the assignee of the present invention, the air cycle machine is coupled to an electric generator. Cooling capacity and airflow rate are reduced by driving the electric generator and extracting useful electric power. The electric power can be used for operating electric equipment onboard the aircraft.

However, the electric generator provides ac power at variable or "wild" frequencies when the air cycle machine is operated at variable speeds. Such ac power might not be usable by certain electric equipment. Electric equipment such as fuel pumps, environmental controls and recirculation fans might be frequency-sensitive and, therefore, require ac power having a certain range of frequencies or even a fixed frequency. To operate such equipment, the ac power generated by the electric generator is converted to a usable frequency by power conditioning electronics. The power conditioning electronics might include a rectifier for providing dc power to the equipment running on dc power, and an inverter for chopping the dc power to ac power having a fixed frequency.

The power conditioning electronics is expensive. For example, an inverter might cost more than ten thousand dollars. Additionally, the power conditioning electronics is heavy. The inverter might add ninety pounds of weight to the aircraft.

There is a need to reduce the size and weight of the power conditioning electronics.

SUMMARY OF THE INVENTION

Size and weight of the power conditioning electronics is reduced in an air conditioning system according to the present invention. The air conditioning system supplies ac power having a limited range of variable frequencies to certain ac equipment and thereby allows the power conditioning electronics to be reduced in size and weight. The air conditioning system includes first and second spools. The first spool includes a high pressure turbine. The second spool includes a low pressure turbine, an electric generator; and controllable load-sharing means such as a fan. The low pressure turbine is cascaded with the high pressure cooling turbine. The electric generator generates ac power at variable frequencies when driven at variable speeds by the low pressure turbine.

The load-sharing means is operable to increase a load on the second spool, reduce the speed of the electric generator and thereby maintain frequency of the ac power below an upper limit.

The air conditioning system further includes a bypass valve for bypassing the high pressure cooling turbine. The bypass valve is controllable to increase the speed of the electric generator and thereby maintain frequency of the ac power generated by the electric generator above a lower limit.

DETAILED DESCRIPTION OF THE INVENTION

Figure 1:
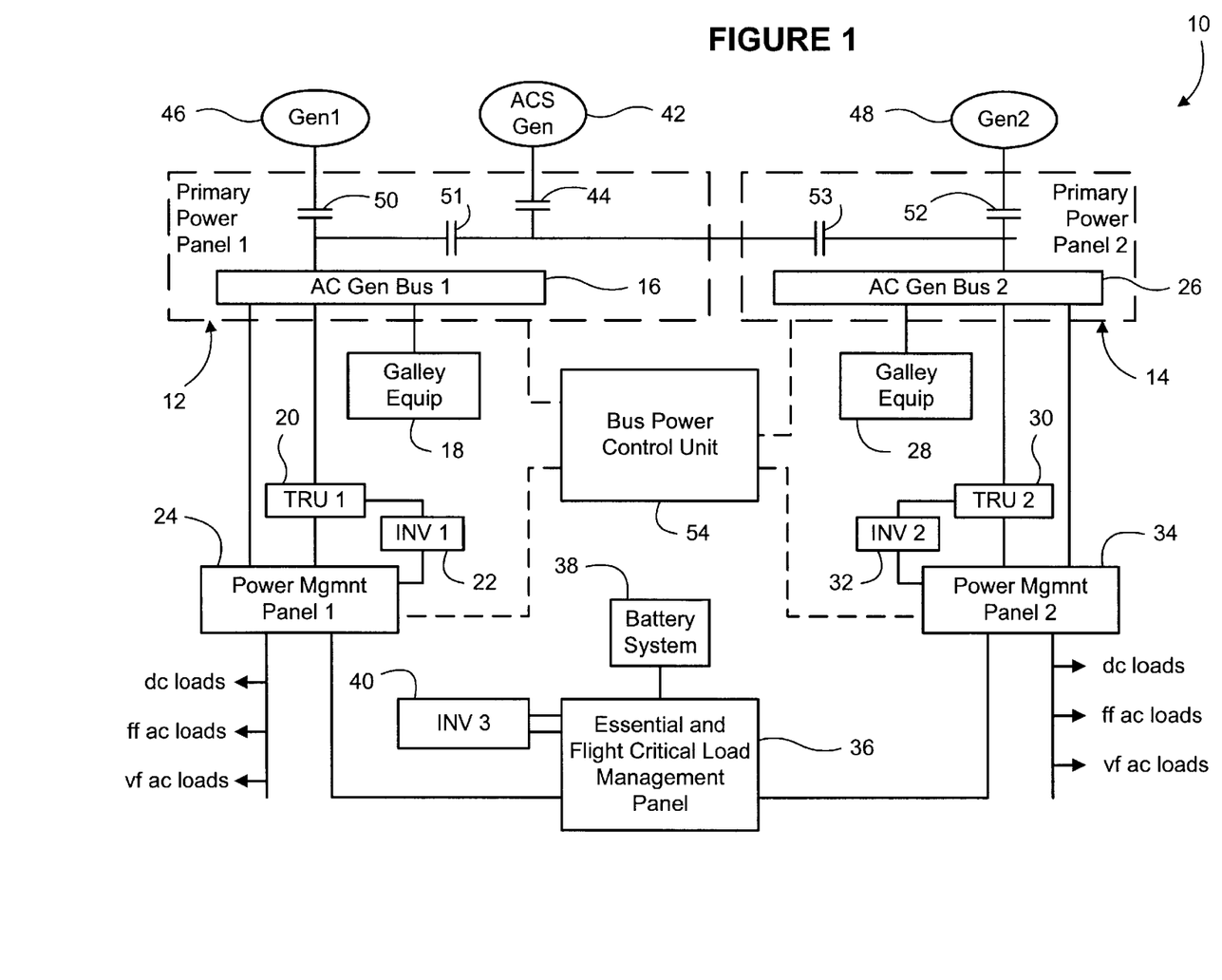
FIG. 1 is a schematic diagram of an aircraft electrical power system according to the present invention.

FIG. 1 shows an electrical power system 10 for an aircraft. The system 10 includes first and second primary power panels 12 and 14, which provide primary power distribution to the aircraft. The first primary power panel 12 includes a first ac generator bus 16, which includes conductors such as copper wires embedded in the hull of the aircraft and buried under panels in the aircraft cabin. The first ac generator bus 16 receives ac power at variable frequencies and supplies the variable frequency ac power to frequency insensitive galley equipment 18 such as galley ovens and chillers. The first ac generator bus 16 also supplies variable frequency ac power to a first transformer-rectifier unit ("TRU") 20, which steps down the ac power and converts the stepped down power to dc power. A first static inverter 22 converts dc power from the first TRU 20 into fixed frequency ac power. The fixed frequency ac power from the inverter 22, the dc power from the first TRU 20 and the variable frequency ac power from the first ac generator bus 16 are supplied to a first power management panel 24. The first power management panel 24 includes a plurality of power relays that can be controlled manually or automatically to provide secondary power distribution to the aircraft. The first power management panel 24 distributes fixed frequency ac power to loads such as hydraulic pumps, fuel pumps, environmental controls, recirculation fans and galley fans. Further, the first power management panel 24 distributes dc power to loads such as communication and navigation equipment and dc instrumentation and electronics. Still further, the first power management panel 24 distributes variable frequency ac power to loads such as ac lighting, gasper fans, and ice and rain protection equipment. The first power management panel 24 also includes a plurality of circuit breakers for line and load fault protection.

The second primary power panel 14 includes a second ac generator bus 26, which provides variable frequency ac power to additional galley equipment 28, a second TRU 30 and second power management panel 34. A second static inverter 32 converts dc power from the second TRU 30 into fixed frequency ac power. The second power management panel 34 provides secondary power distribution of variable frequency ac power from second ac generator bus 24, dc power from the second TRU 30 and fixed frequency ac power from the second inverter 32. The second primary power panel 14, the second TRU 30, the second inverter 32 and the second power management panel 34 can provide system redundancy, which increases reliability of the system 10.

The ac generator buses 16 and 26 handle ac power having a limited range of frequencies. For example, the frequency of the ac power can be between 400 Hz and 800 Hz. Powering certain equipment at variable frequencies and other equipment at a fixed frequency allows the size and weight of the static inverters 22 and 32 to be reduced because the static inverters 22 and 32 do not have to supply ac power to all of the equipment. For certain aircraft, it is believed that the static inverters 22 and 32 can be reduced in size by as much as 70 percent.

An Essential and Flight Critical Load Management Panel 36 provides ac and dc power to selected flight instruments in the event primary power is lost. The dc power is supplied by a battery system 38, and the ac power is supplied by a combination of the battery system 38 and a third static inverter 40. The third static inverter 40 converts the dc power from the battery system 38 to fixed frequency ac power.

Primary power is supplied to either the first or second ac generator bus 16 or 26 by a generator 42, which forms a part of an aircraft air conditioning system ("ACS"). The ACS generator 42 is operable to provide ac power at variable frequencies, the ac power being controlled within a limited range. Having a four-pole design and a maximum speed of 24000 rpm, for example, the ACS generator 42 can produce ac power having a frequency between 400 Hz and 800 Hz. The ACS generator 42 is sized to provide full bus loads at all times to either the first or second ac generator bus 16 or 26. During normal operating conditions, the ACS generator 42 is selectively connected to one of the first and second ac generator buses 16 and 26 by a first power relay 44 and either a second or third power relay 51 or 53.

Primary power is supplied to the other of the first and second ac generator buses 16 and 26 by closing either a fourth of fifth power relay 50 or 52 to connect one of the aircraft's two main engine generators 46 or 48. When a backup for the ACS generator 42 is needed, the main engine generators 46 and 48 are connected to the first and second generator buses 16 and 26, respectively, by closing the fourth and fifth power relays 50 and 52 and the ACS generator 42 is disconnected by opening the first power relay 44. Typically, there will be a main engine generator 46 or 48 corresponding to each main engine of the aircraft, and an ac generator bus 16 or 26 corresponding to each main engine generator 46 or 48. Each main engine generator 46 and 48 is operable to provide ac power having a limited frequency range. Having a 4-pole design and a maximum speed of 24000 rpm, each main engine generator 46 and 48 can operate between 50% and 100% of maximum speed and produce ac power between 400 Hz and 800 Hz.

Such an electrical power system 10 offers increased reliability due to the additional redundancy between the main engine generators 46 and 48 and the ACS generator 42. Such an electrical power system 10 also reduces aircraft fuel consumption because the ACS generator 42, not a main engine generator 46 or 48, is providing electricity to one of the ac generator buses 16 or 26.

The electrical power system 10 further includes a bus power control unit ("BPCU") 54 for controlling the power relays 44, 50, 51, 52 and 53 to connect either the ACS generator 42 or one of the main engine generators 46 and 48 to the first and second ac generator buses 16 and 26. In addition to controlling the power relays 44, 50, 51, 52 and 53, the BPCU 54 controls the relays in the first and second power management panels 24 and 34 and the Essential and Flight Critical Load Management Panel 36. The BPCU 54 also collects and transmits diagnostic information to the aircraft's information system.

Figure 2:
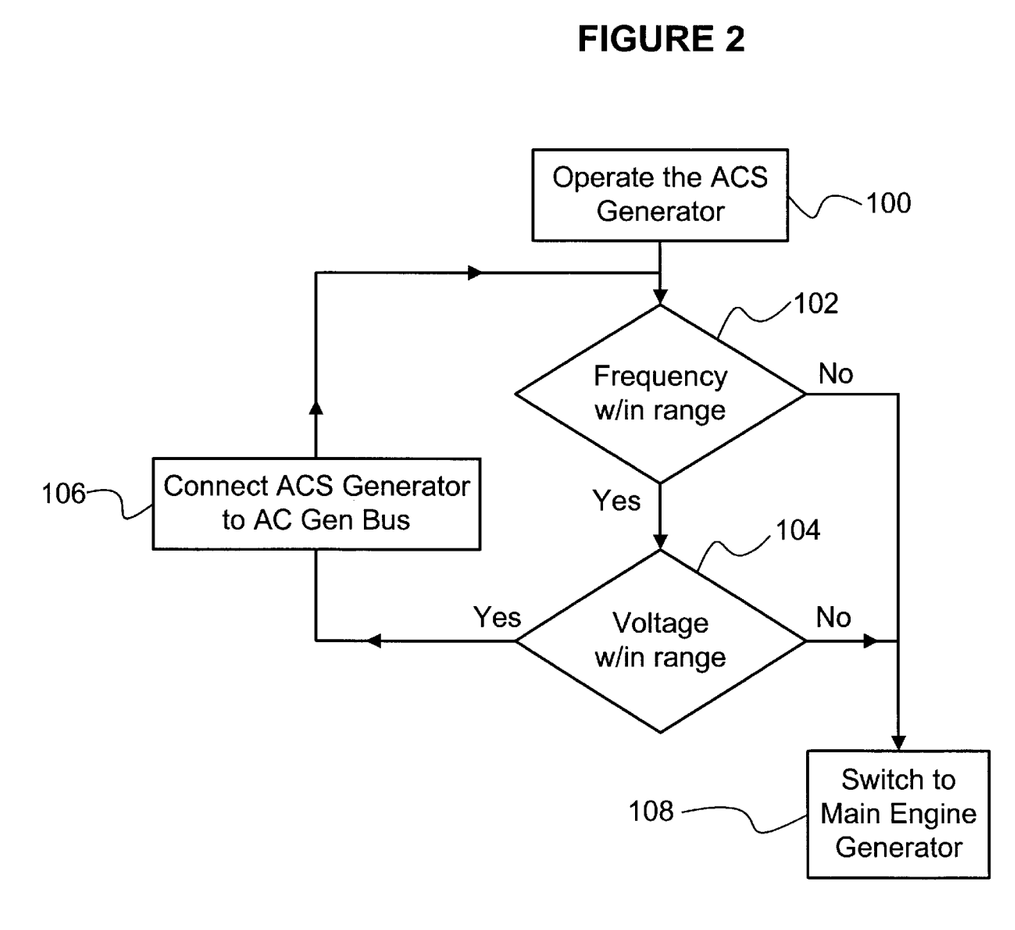
FIG. 2 is a flowchart of a method of generating electrical power for an aircraft.

FIG. 2 shows control logic implemented by the BPCU 54. The ACS generator 42 is driven by the aircraft air conditioning system when, for example, the aircraft air conditioning system is receiving bleed air from an APU or one of the main engines 46 or 48 (block 100). The ACS generator 42 is driven at variable speeds and, therefore, generates ac power having a range of frequencies.

When the BPCU 54 detects that both the frequency and voltage of the ac power are within acceptable limits (blocks 102 and 104), the BPCU 54 commands the power relays 44, 50, 51, 52 and 53 to connect the ACS generator 42 and one of the main engine generators 46 or 48 to the first and second ac generator buses 16 and 26 (block 106). When the BPCU 54 detects that either the frequency or the voltage goes out of range (blocks 102 or 104), the BPCU 54 commands the power relays 44, 50, 51, 52 and 53 to disconnect the ACS generator 42 and connect the main engine generators 46 and 48 to the first and second ac generator buses 16 and 26, respectively (block 108).

Figure 3:
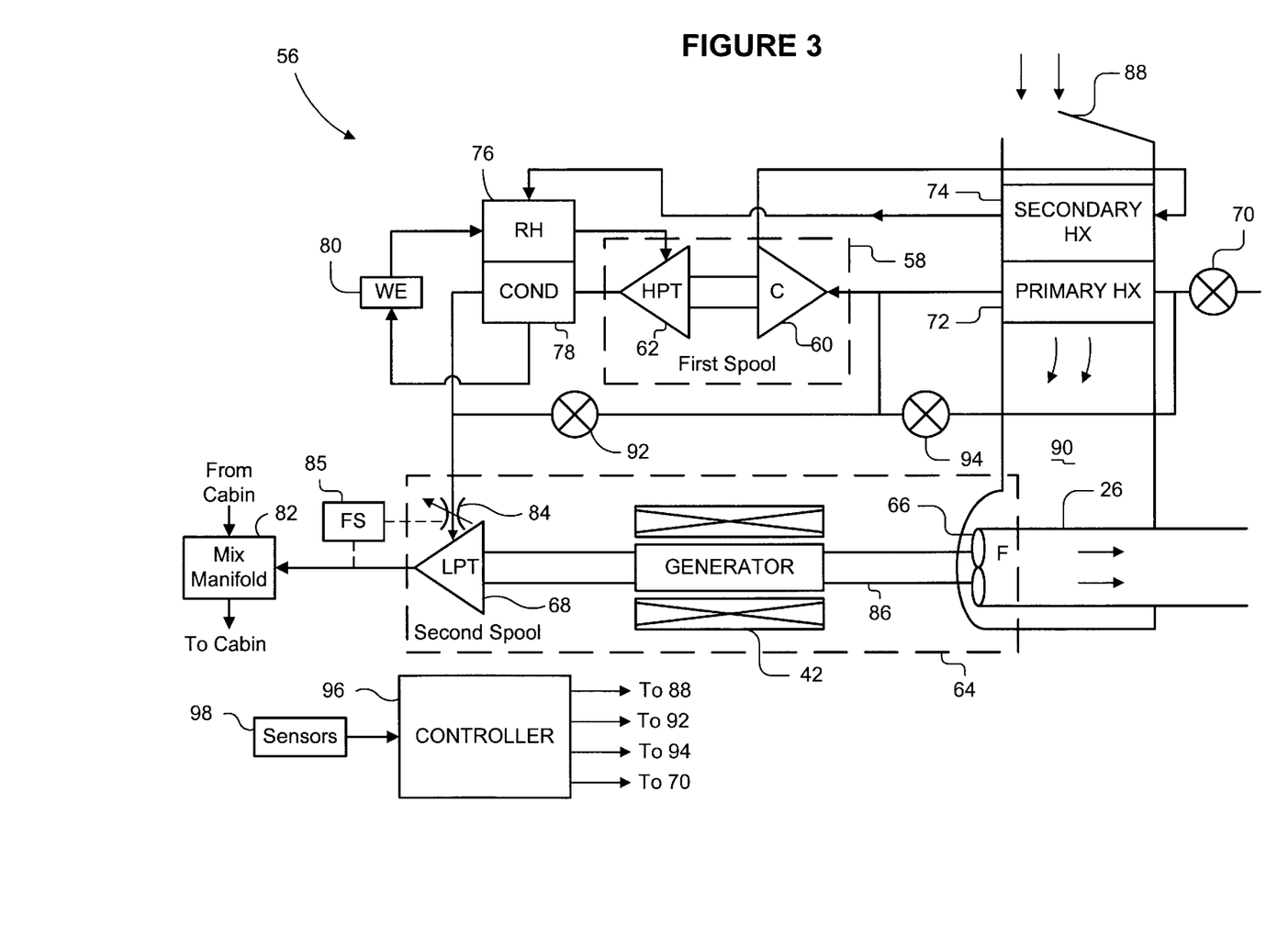
FIG. 3 is a schematic diagram of an aircraft air conditioning system including an electric generator, the generator forming a part of the electrical power system shown in FIG. 1.

FIG. 3 shows the ACS generator 42 as part of an aircraft air conditioning system ("ACS") 56. The ACS 56 includes two spools: a first spool 58 including a compressor 60 and a high pressure turbine 62, and a second spool 64 including a fan 66, the ACS generator 42 and a low pressure turbine 68. The ACS 56 is typically located in the belly or tail cone of the aircraft.

Bleed air from a compressor stage of an aircraft engine, an auxiliary power unit or a ground cart (not shown) is supplied via a shutoff valve 70 to a hot side of a primary air-to-air heat exchanger 72. In the primary air-to-air heat exchanger 72, heat of compression is removed from the bleed air and dumped to ambient.

Hot side outlet air of the primary heat exchanger 72 is compressed by the compressor 60 and supplied to a hot side of a secondary heat exchanger 74. In the secondary air-to-air heat exchanger 74, heat of compression is removed and dumped to ambient. The compressor 60 provides an air cycle lift, which allows the primary heat exchanger 72 to be smaller.

High pressure water separation is then performed. Air leaving the hot side of the secondary air-to-air heat exchanger 74 is supplied to a hot side of a reheater 76, where additional heat is removed. Air leaving the hot side of the reheater 76 is supplied to a hot side of a condenser 78, which causes moisture entrained in the air to form condensate. Higher pressure resulting from the compressor 60 enhances the formation of condensate and reduces the presence of vapor in the air.

Air leaving the condenser 78 is supplied to a water extractor 80. Inside the water extractor 80, a vaned swirl section centrifuges the condensate against a duct wall, causing the condensate to be trapped in an annular space formed by a duct wall liner that begins downstream of the vaned swirl section. The duct wall liner isolates dehumidified air from moisture-laden air in the annular space. The condensate trapped in the annular space is collected by a sump that is several duct diameters downstream of the vanes. The condensate collected by the sump is sprayed at a ram air inlet of the secondary heat exchanger 74.

Dehumidified air leaving the water extractor 80 is supplied to a cold side of the reheater 76 and reheated. Reheating puts more energy into the dehumidified air, which allows for greater cooling in the high pressure turbine 62. Additionally, reheating increases turbine reliability by minimizing the formation of ice on the wheel of the high pressure turbine 62.

Air leaving the hot side of the reheater 76 is expanded in the high pressure turbine 62 and cooled to a temperature between 0° F. and 50° F. Shaft power resulting from the expansion in the high pressure turbine 62 is used to drive the compressor 60. Air leaving the high pressure turbine 62 is supplied to a cold side of the condenser 78, where additional energy from a roughly 50° F. rise in temperature is put into the air. Such reheating increases cooling and reliability of the low pressure turbine 68. Air leaving the cold side of the condenser 78 is expanded in the second cooling turbine 68 and cooled to sub-freezing temperatures.

The sub-freezing air from the low pressure turbine 68 is supplied to a mix manifold 82. Inside the mix manifold 82, the subfreezing air is mixed with air from the aircraft cabin. Cool, conditioned air leaving the mix manifold 82 is supplied to the aircraft cabin.

The low pressure turbine 68 has a variable geometry inlet nozzle 84, which optimizes airflow and power extraction. The area of the nozzle 84 is adjustable to control the flow of cooled, conditioned air into the cabin as the cabin pressure and bleed air pressure change. When pressure is increased, air density becomes higher and, therefore, less volumetric flow is needed to achieve the same mass flow through the cabin. Therefore, area of the nozzle 84 is decreased. Conversely, the area of the nozzle 84 is increased when pressure is decreased. A flow sensor 85 provides feedback to the nozzle 84 for the adjusting the nozzle area.

Shaft power resulting from the expansion in the low pressure turbine 68 is used to drive the fan 66 and the ACS generator 42. The ACS generator 42 is a voltage-regulated, variable frequency generator such as a traditional wound rotor rotating rectifier machine that supplies constant voltage at variable speed. Such a machine is an industry standard for aircraft power generation. The wound rotor is mounted directly to a common shaft 86 and driven at shaft speeds, without the need for a gearbox. In the alternative, the ACS generator 42 could be a Rice machine or a homopolar machine.

When ac power is extracted from the ACS generator 42 (for example, by turning on a piece of electrical equipment), a load is placed on the shaft 86. The load is transmitted by the shaft 86 to the fan 66 and the lower pressure turbine 68.

The ACS generator 42 is driven by the low pressure cooling turbine 68 at variable speeds because generator load and bleed flow conditions change during the flight of the aircraft. For example, the ACS generator 42 might be operated between 50% and 100% of maximum speed. Consequently, the ACS generator 42 generates ac power having a variable frequency and constant voltage. The variable frequency, constant voltage ac power is extracted from the ACS generator 42 and supplied directly to either the first or second ac generator bus 16 or 26.

The fan 66 draws ambient air through a ram air door 88, into a supply plenum 90 and through the heat exchangers 72 and 74. Heat is carried away from the heat exchangers 72 and 74 and dumped to ambient. A check valve (not shown) allows air to flow around the fan 66, if necessary. The fan 66 provides the sole source of cooling air for the heat exchangers 72 and 74 while the aircraft is on the ground. Therefore, the fan 66 is designed for maximum efficiency at a minimum operating speed (e.g., 50% of maximum speed).

The fan 66 has a load line that follows a speed-cubed characteristic. When the shaft speed of the second spool 64 increases above a nominal design speed, the fan load increases as a non-linear function of the shaft speed.

The speed-cubed characteristic of the fan 66 is advantageously used to create a balanced load-sharing between the ACS generator 42 and the fan 66. While energy is being extracted from the ACS generator 42, a generator load is placed on the shaft 86. When the load is shed (for example, by turning off a galley oven), speed of the shaft 86 begins to increase. However, the increase in shaft speed causes the fan load to increase non-linearly and ultimately limit the shaft speed. The shaft speed is inherently maintained below an upper limit without the need for a speed governor or any other active speed control. When the ACS generator load is reapplied, the shaft speed and fan load are decreased. Thus, an upper limit can be set by proper design of the fan 66.

Speed of the shaft 86 and, therefore, frequency of the ac power generated by the ACS generator 42 can be maintained above a lower limit by a bypass valve 92. The bypass valve 92 is coupled between a hot side outlet of the primary heat exchanger 72 and an inlet of the low pressure turbine 68.

When the shaft speed is approaching the lower limit, the bypass valve 92 is opened to increase the pressure to the low pressure turbine 68 and thereby increase the speed of the ACS generator 42 above the lower limit. Since the high pressure turbine 62 is bypassed, the benefit of cascading the high pressure cooling turbine 62 (i.e., greater air cycle lift) is lost. However, the ram air door 88 is opened to allow for more cooling by the heat exchangers 72 and 74. The increase in heat transfer to ram air lowers the temperature of the bleed air leaving the heat exchangers 72 and 74 and, therefore, partially compensates for the loss of cycle lift. The variable nozzle 84 is opened somewhat to allow for a constant supply of air to the cabin.

When shaft speed is approaching the upper limit, the pressure supplied to the low pressure power turbine 68 is lowered by closing down the bypass valve 92 and diverting additional air through the first spool compressor 60 and high pressure turbine 62. Consequently, compressor work increases the air cycle lift. The ram air door 88 is closed down to limit the flow of cooling air across the heat exchangers 72 and 74, as the cycle lift would otherwise make the air leaving the mix manifold 82 too cold. The variable nozzle 84 is opened somewhat to allow for a constant supply of air to the cabin.

Figure 4:
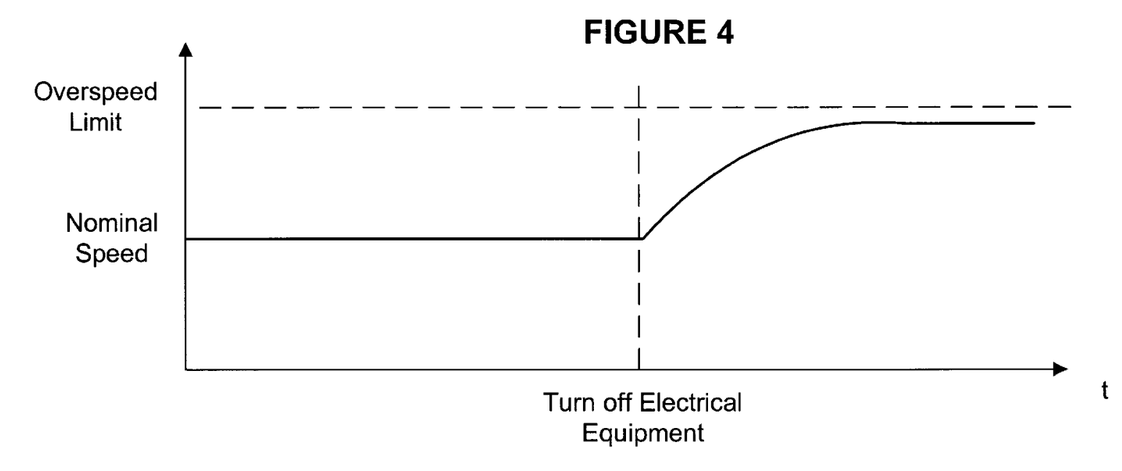
FIGS. 4 and 5 are plots of shaft speed versus time for a second spool under different load conditions of the air conditioning system.

Reference is now made to FIG. 4, which shows an example of shaft speed of the second spool 64 being kept below an overspeed limit. Assume that the second spool 64 is operating at a nominal speed with the galley oven turned on. That is, the second spool 64 is operating at nominal speed while the ACS generator 42 is placing a large load on the shaft 86. When the galley oven is turned off, the large ACS generator load is shed and the speed of the second spool 64 begins to increase. However, the speed of the fan 66 also begins to increase. Additionally, the fan load on the shaft 86 begins to increase as a function of speed-cubed. As the fan load is increased, the overspeed limit is approached, but not exceeded.

Figure 5:
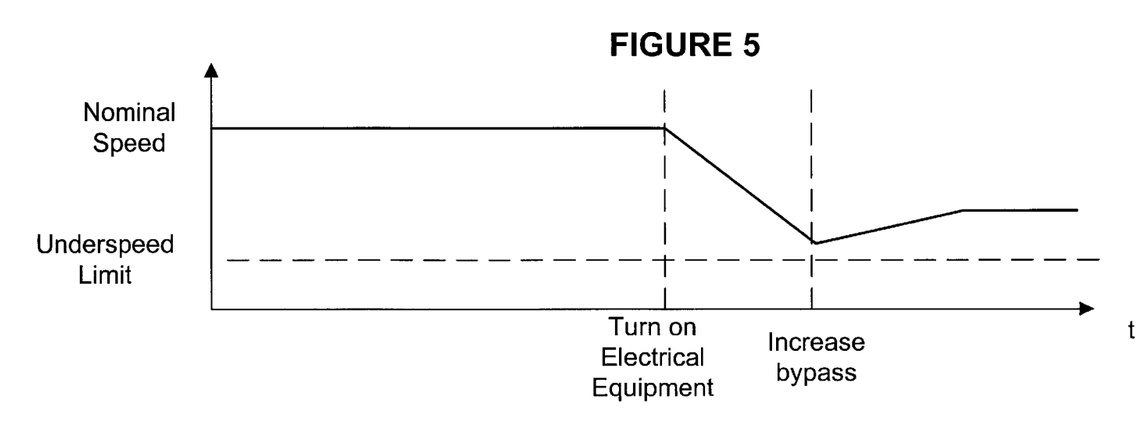

Reference is now made to FIG. 5, which shows an example of shaft speed of the second spool 64 being kept above an underspeed limit. Assume that the second spool 64 is operating at a nominal speed with the galley oven turned off. When the galley oven is turned on, the ACS generator 42 places a large load on the shaft 86, causing the shaft speed begins to decrease. The bypass valve 92 is opened fully to provide bottoming control and keep the shaft speed of the second spool 64 above the underspeed limit. After the bypass valve 92 is opened, the shaft speed begins to increase. The underspeed limit is approached, but never reached. Cabin temperatures are kept at comfortable levels by opening the ram air door 88.

Returning to FIG. 3, the ACS 56 also includes a temperature control valve 94, which allows a portion of the bleed air to bypass the primary heat exchanger 72 on cold days or in full heating mode. The temperature control valve 94 allows the temperature of the air leaving the mix manifold 82 to be increased. Additionally, the temperature control valve 94 provides protection against temperatures dropping to subfreezing levels in the water extractor 80.

A controller 96 receives signals from sensors 98 such as a shaft speed sensor and temperature sensors indicating temperatures of air entering the water extractor 80, air leaving the low pressure turbine 68 and air leaving the compressor 60. The shaft speed sensor signal allows for control of the shaft speed and, therefore, ac power frequency. The temperature sensor signals allow for basic temperature control as well as protection against system icing and compressor overtemperature. In response to the sensor signals, the controller 96 controls the ram air door 88, the bypass valve 92 and the temperature control valve 94. The controller 96 also controls the shutoff valve 70.

Figure 6:
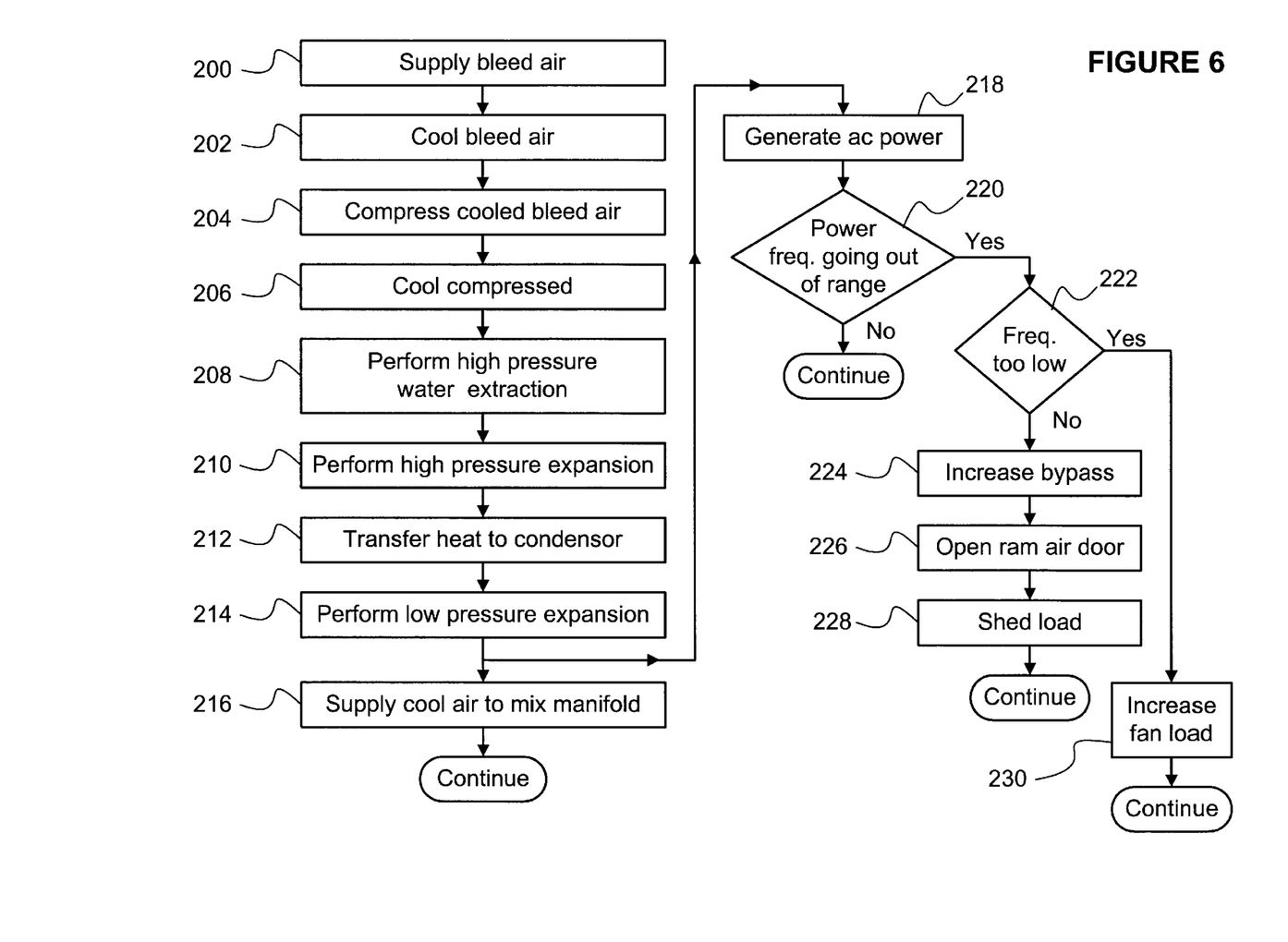
FIG. 6 is a flowchart of a method of operating the air conditioning system.

FIG. 6 illustrates the air cycle of the ACS 56. Bleed air is supplied to the primary heat exchanger 72 (block 200) and cooled (block 202). The cooled bleed air is compressed by the compressor 60 (block 204) and cooled again in the secondary heat exchanger 74 (block 206). High pressure water extraction is performed on the air leaving the secondary heat exchanger 74 (block 208), and the resulting dehumidified air is expanded and cooled in the high pressure turbine 62 (block 210). Heat is transferred to the condenser 78 (block 212), giving a cycle lift. Air leaving the condenser 78 is expanded and further cooled to subfreezing temperatures in the low pressure turbine 68 (block 214). The subfreezing air is supplied to the mix manifold 82, and a mixture of the subfreezing air and cabin air is supplied to the aircraft cabin. The cycle continues.

Shaft power is created by the expansion of air in the low pressure turbine 68. The shaft power, in turn, causes the ACS generator 42 to generate ac power (block 218). Varying shaft speeds will result in ac power having varying frequencies. When the shaft speed of the second spool 64 and, therefore, the frequency of the ac power is going too low (blocks 220 and 222), the bypass valve is opened (block 224). Since the high pressure turbine 62 is being bypassed, the ram air door 88 is opened to increase cooling (block 226). If the frequency of the ac power is still too low, a load on the ACS generator 42 can be shed by turning off electrical equipment (block 228). Although the underspeed limit is approached, it is never reached. The ACS generator 42 continues generating ac power.

When the shaft speed of the second spool 64 and, therefore, the frequency of the ac power is going too high (blocks 220 and 22), the fan load increases as a function of speed-cubed (block 230). The overspeed limit is approached but, due to the rapidly increasing fan load, it is never reached. The ACS generator 42 continues generating ac power.

Actual control of the bypass valve 92, temperature control valve 94 and ram air door 88 will depend upon flight and electrical load conditions. In situations where maximum refrigeration is required, the bypass valve 92 and the ram air door 88 can be fully opened by the controller 96. In situations where the temperature of the ambient air is cool and refrigeration is not required, the ACS 56 will deliver electricity and warmer air, as required. The controller 96 will open the temperature control valve 94 or open the bypass valve 92.

In a large commercial aircraft, cooling is more difficult to perform during ground operation because the fan 66 supplies all of the cooling air. During flight, however, ram air pressure provides all of the cooling flow needed, which allows the high pressure turbine 62 to be bypassed. At altitudes below the cloud tops, where ambient moisture could be present, all of the cycle air passes through the first spool 58 and the high pressure water extraction loop.

The ACS 56 can be run on the ground on a hot day when the main engines are off and still meet certain cooling requirements. This is called an Auxiliary Power Unit ("APU") condition. The APU supplies refrigerated air to the cabin and electricity to the aircraft. The APU shaft load shifts to the compressor which must deliver higher bleed pressures in order for the ACS 56 to provide both air conditioning and electricity. For electric power generation only, the load compressor bleed pressure is dropped to an unloaded condition using inlet guide vanes. The ACS 56 operates in a high pressure spool bypass to deliver ambient temperature ventilation air to the cabin.

Thus disclosed is an aircraft air conditioning system that generates ac power by recovering energy that would otherwise be wasted. Fuel is saved, and the cost of operating the aircraft is lowered.

The ACS 56 can maintain shaft speed and, therefore, frequency of the ac power within upper and lower limits. Consequently, the ac power can be used to operate variable frequency equipment onboard the aircraft, which allows for the size and weight of the inverters to be reduced.

Additionally, the ACS 56 includes cascaded high and low pressure turbines, which results in a more efficient thermodynamic cycle and allows the air to be cooled to subfreezing temperatures. Consequently, less air is used to cool the aircraft cabin.

The ACS 56 is used advantageously in the electrical power system 10 above, but it is not limited to such use. The ACS 56 is especially useful for any aircraft having on-board electrical equipment that can be operated at variable frequencies. Thus, the ACS is especially useful for commercial aircraft. However, the ACS 10 can also be useful for regional, corporate and military aircraft.

The invention is not limited to the specific embodiments described above. For example, the ACS 56 could use a water separator instead of the water extractor 80. Any device following a non-linear load line could be used in place of the fan 66. One such device is a turbocompresssor, which also has a speed-cubed load characteristic. The compressor 60 in the first spool 58 could be replaced by a fan, which would allow the secondary heat exchanger 74 to be eliminated.

These considerations, and other considerations including the size of the ACS generator 42, the size of the first and second spools 58 and 64, the sizes of the reheater 76 and the heat exchanger 72 and 74, are all dependent upon the application for which the ACS 56 is intended. Therefore, the invention is not limited to the specific embodiments above. Instead, the invention is limited only by the claims that follow.

We claim:

1. An air conditioning system comprising:
   a first spool including a high pressure turbine;
   a second spool including a low pressure turbine, an electric generator; and a device having a non-linear load line, the low pressure turbine being cascaded with the high pressure cooling turbine, the electric generator generating ac power at variable frequencies when driven at variable speeds by the low pressure turbine; and
   a bypass valve for bypassing the high pressure turbine;
   the bypass valve increasing the speed of the electric generator to maintain frequency of the ac power generated by the electric generator above a lower frequency limit, the device increasing a load on the second spool and thereby reducing the speed of the electric generator to maintain the frequency of the ac power below an upper frequency limit.

2. The system of claim 1, wherein the device has a speed-cubed load characteristic such that maximum speed of the second spool is inherently limited to maintain the frequency of the ac power below the upper limit.

3. The system of claim 1, wherein the low pressure turbine includes a variable geometry inlet nozzle.

4. The system of claim 1, wherein the electric generator is a voltage-regulated, variable frequency generator.

5. The system of claim 1, further comprising a mix manifold downstream the low pressure turbine.

6. The system of claim 1, further comprising high pressure water removal apparatus upstream the high pressure turbine, wherein the water removal apparatus is bypassed when the high pressure turbine is bypassed.

7. The system of claim 6, wherein the first spool further includes a compressor for boosting pressure of air entering the water removal apparatus.

8. The system of claim 6, further comprising a reheater, downstream the water removal apparatus and upstream the low pressure turbine, for reheating air prior to the air entering an inlet nozzle of the low pressure turbine.

9. The system of claim 1, further comprising means for controlling the bypass valve to bypass the high pressure turbine when the frequency of the ac power is approaching the lower frequency limit, whereby speed of the electric generator is increased and the frequency of the ac power is maintained above the lower limit.

10. The system of claim 9, further comprising a heat exchanger having a hot side upstream the high pressure turbine, the system further comprising a ram air door for allowing cooling air to flow through the heat exchanger, wherein the controlling means further controls the ram air door to allow additional air to flow through the heat exchanger while the high pressure turbine is being bypassed.

11. An air conditioning system comprising:
    a heat exchanger;
    a ram air door for allowing cooling air to flow through the heat exchanger;
    a first spool including a high pressure turbine for expanding bleed air cooled in the heat exchanger;
    a second spool including a fan for drawing a stream of cooling air through the ram air door and through the heat exchanger, the second spool further including an electric generator, and a low pressure turbine for expanding air expanded in the high pressure turbine; and
    a bypass valve coupled between a hot side outlet of the heat exchanger and an inlet nozzle of the low pressure turbine;
    the bypass valve increasing pressure at the nozzle inlet of the low pressure turbine to increase the speed of the electric generator and maintain frequency of ac power generated by the electric generator above a lower limit, the fan placing a load on the second spool and increasing the load on the second spool to reduce the speed of the second spool and maintain frequency of the ac power below an upper limit, the ram door increasing the flow of cooling air to the heat exchanger while the high pressure turbine is being bypassed.

12. The system of claim 11, wherein the fan has a load line that follows a speed-cubed load characteristic such that maximum speed of the second spool is inherently limited.

13. The system of claim 11, wherein the inlet nozzle is a variable geometry inlet nozzle.

14. The system of claim 11, wherein the electric generator is a voltage-regulated, variable frequency generator.

15. The system of claim 11, further comprising high pressure water removal apparatus intermediate the high pressure turbine and a hot side of the heat exchanger, the water removal apparatus being bypassed when the high pressure turbine is bypassed.

16. The system of claim 15, further comprising a compressor and secondary heat exchanger for boosting pressure of air entering the water removal apparatus, the compressor forming a part of the first spool.

17. The system of claim 11, further comprising means for controlling the bypass valve and the ram air door, the controlling means controlling the bypass valve to bypass the high pressure turbine when frequency of the ac power is approaching the lower limit, the controlling means controlling the ram air door to allow additional air to flow through the heat exchanger while the high pressure turbine is being bypassed.

18. A method of operating an air conditioning system including a high pressure turbine cascaded with a low pressure turbine, the high pressure turbine being a part of a first spool, the low pressure turbine being a part of a second spool, bleed air being supplied to the air conditioning system, the method comprising the steps of:
    cooling the supply of bleed air;

expanding the cooled bleed air in the high pressure turbine;

expanding air leaving the high pressure turbine in the low pressure turbine;

bypassing the high pressure turbine when speed of the second spool approaches a lower limit; and adding a load on the second spool when the speed of the second spool approaches an upper limit, the load being added according to a speed-cubed function of the second spool speed.

19. The method of claim 18, wherein the bleed air is cooled with a heat exchanger, and wherein the method further comprises the steps of providing a flow of cooling fluid to the heat exchanger: and increasing the flow of the cooling fluid while the high pressure turbine is being bypassed.

20. The method of claim 18, the low pressure turbine having a variable geometry inlet nozzle, the variable geometry inlet nozzle having an adjustable area, the method further comprising the step of adjusting the nozzle area in response to variations in density of air flowing through the low pressure turbine.

* * * * *